Patented Feb. 14, 1933

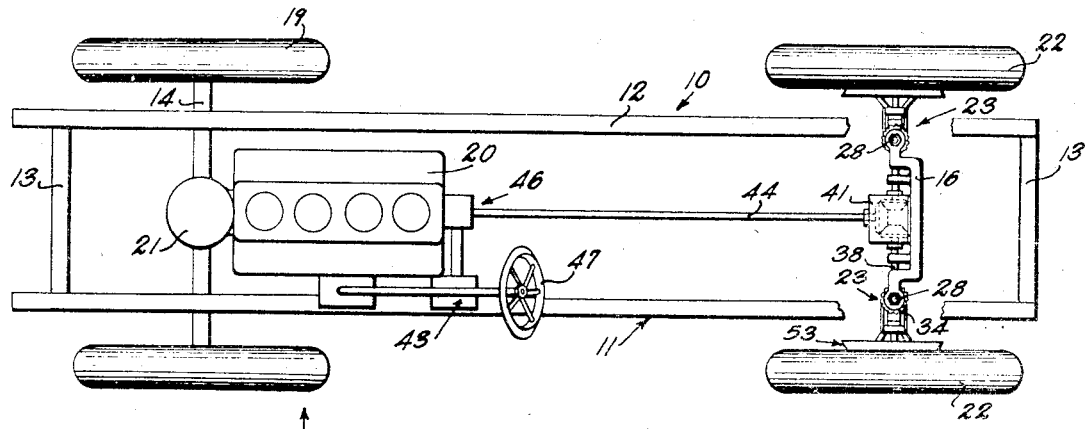
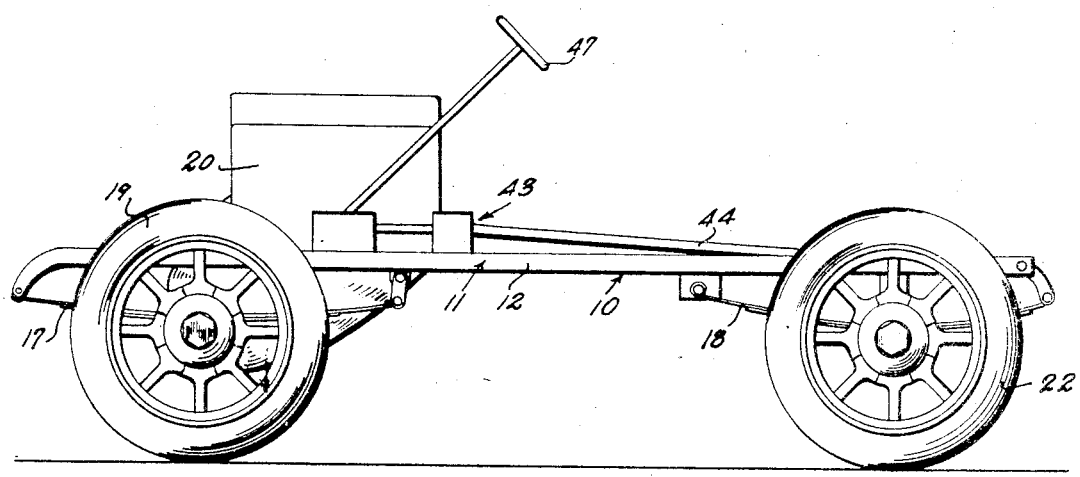
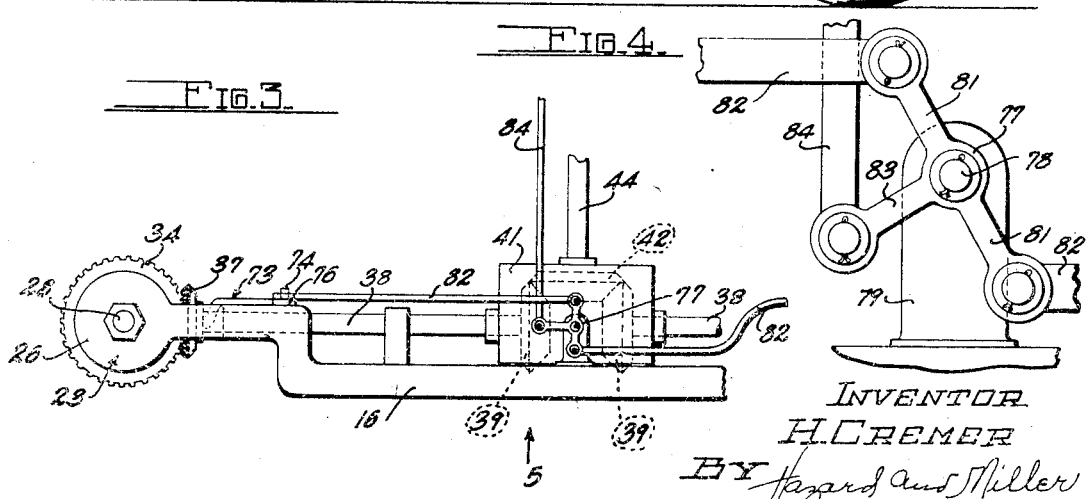

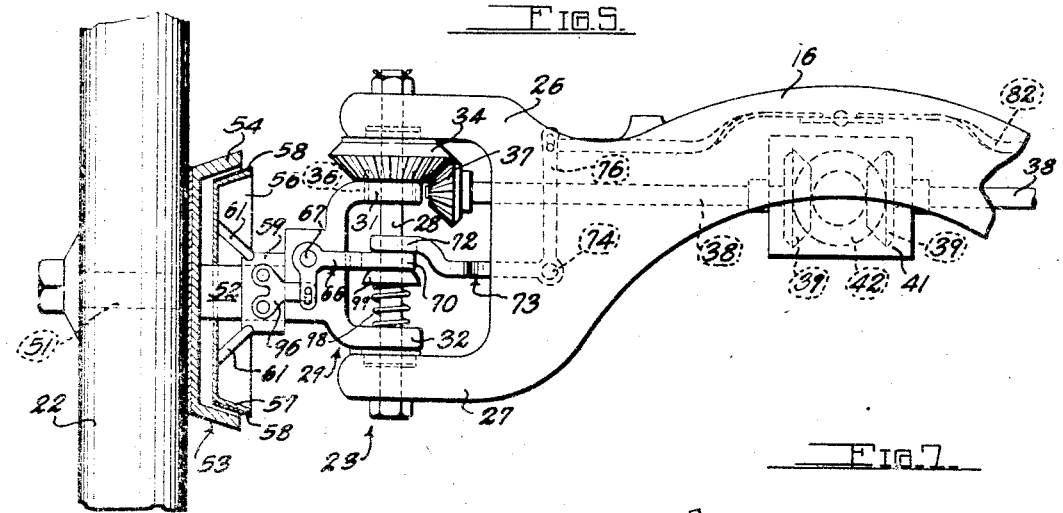
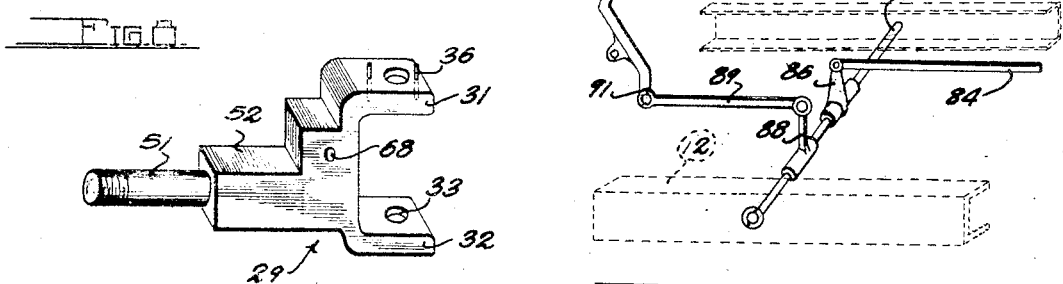
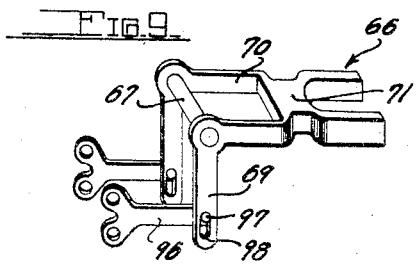
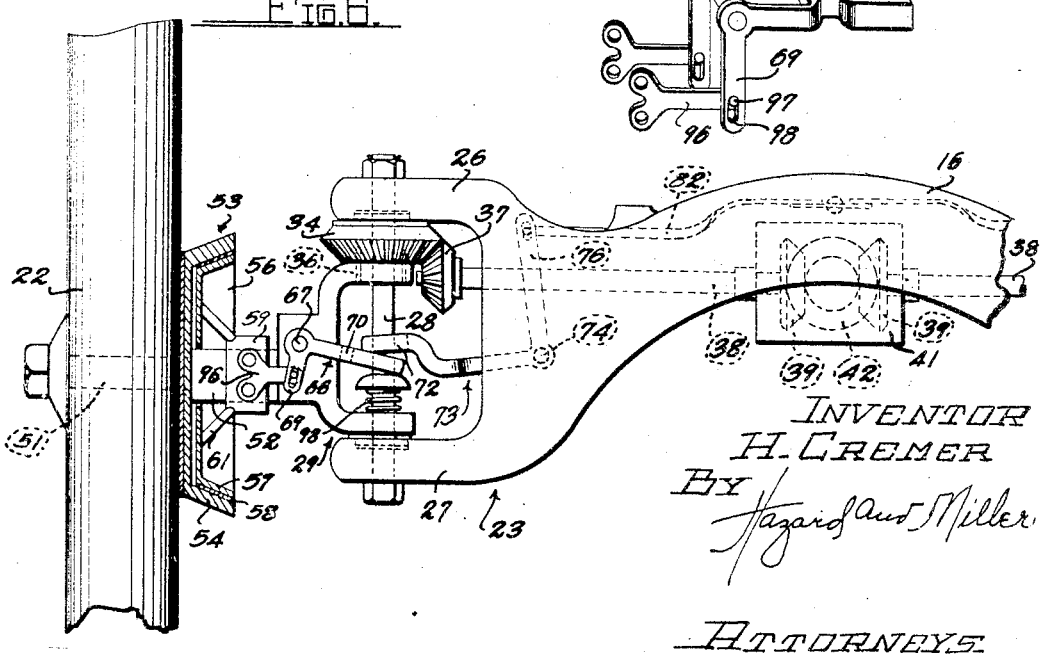

1,897,551

UNITED STATES PATENT OFFICE

HENRY CREMER, OF SOUTHGATE, CALIFORNIA

REAR AXLE STEERING WITH FRONT WHEEL DRIVE

Application filed October 22, 1931. Serial No. 570,420.

This invention relates to automotive vehicles, and has for an object the provision of a novel design of automotive vehicle wherein the power is applied to the front wheels and the steering is accomplished by means of the rear wheels.

Another object is to provide a novel and unusually efficient steering mechanism for use in connection with the vehicle of the present invention.

The invention possesses other objects and advantageous features, some of which, with those enumerated, will be set forth in the following description of the invention's particular embodiment which is illustrated in the drawings accompanying and forming a part of the specification.

Referring to the drawings:

Fig. 1 is a top plan view of the chassis of an automobile embodying the principles of the present invention, portions of the figure being broken away to disclose some of the operative portions of the device.

Fig. 2 is a view in side elevation, the direction of view being indicated by the arrow 2 of Fig. 1.

Fig. 3 is an enlarged top plan view of the rear axle assembly, a portion of the figure being broken away to reduce its size.

Fig. 4 is an enlarged top plan view of a portion of the structure illustrated upon Fig. 3.

Fig. 5 is a view in rear elevation of the rear axle assembly, the direction of view being indicated by the arrow 5 of Fig. 3. A portion of the braking mechanism is shown in vertical section, with the operative portions of the device in brake-releasing position.

Fig. 6 is a view similar to Fig. 5, with the brake applied.

Fig. 7 is a diagrammatic perspective view showing a portion of the mechanism for controlling the brake.

Fig. 8 is a perspective view of one of the steering knuckles.

Fig. 9 is a perspective view of one of the double bell cranks which forms a portion of the brake-operating mechanism.

Referring more particularly to the drawings, I show at 10 the chassis of an automotive vehicle embodying the principles of the present invention, and comprising a frame 11 having longitudinal members 12 joined by transverse members 13 in accordance with customary practice. Front and rear axles 14 and 16 are mounted upon the frame by front and rear springs 17 and 18, respectively.

A motor 20 of any suitable design is mounted upon the frame 11, and is adapted to deliver rotative power to the front wheels 19 which are mounted upon the front axle 14, through the expedient of a suitable differential mechanism which is not shown, but which is enclosed within a suitable housing 21.

Steering of the vehicle is accomplished by means of the rear wheels 22 which are mounted upon the rear axle 16 by means of Lemoine pivots indicated in their entirety at 23.

The construction and operation of the rear axle assembly and the Lemoine pivots associated therewith will best be understood by reference to Figs. 3, 5, and 6. Each end of the rear axle 16 is bifurcated to provide vertically spaced prongs 26 and 27 extending substantially parallel with each other. A vertical shaft 28 extends between the prongs 26 and 27 at each end of the rear axle 16, and serves as the pivotal mounting for a steering knuckle 29 which is illustrated in detail upon Fig. 8. The inner end of each steering knuckle 29 is bifurcated to provide spaced prongs 31 and 32 having alined apertures 33 therein, whereby each knuckle is mounted upon the associated vertical shaft 28 with the prongs 31 and 32 disposed between the prongs 26 and 27. The distance between the outer surfaces of the prongs 31 and 32 is sufficiently less than the distance between the inner surfaces of the prongs 26 and 27 to permit a bevel gear 34 to be accommodated between the upper prong 31 of each steering knuckle and the upper prong 26 at the associated end of the axle 16. This gear 34 is rigidly connected to the upper prong 31 of the steering knuckle in any suitable manner, such as by pins 36. Each of the bevel gears 34 is enmeshed by a driving bevel gear 37 mounted rigidly upon a transverse shaft 38 which extends from the associated Lemoine pivot 23 to a position adjacent the central portion of the axle 16, where it is provided with another bevel gear 39 within a suitable housing 41. Both gears 39 are enmeshed with another gear 42 within the housing 41, but upon opposite sides of the axis of rotation thereof, so that when the gear 42 is turned, the gears 39 and their respective shafts 38 will also be turned, but in opposite directions with respect to each other. This will cause rotation of the gears 34, both turning in the same direction and carrying with them the steering knuckles 29, to which they are rigidly secured. This movement of the steering knuckles is effected by a suitable steering mechanism 43, which includes a shaft 44 upon which the gear 42 is mounted, and which is connected by any suitable mechanism 46 to a steering wheel 47 conveniently accessible to the driver of the vehicle.

Each of the steering knuckles 29 is provided with a spindle portion 51, upon which the associated rear wheel 22 is journaled for free rotation thereabout; and between the spindle 51 and the prongs 31 and 32 of each steering knuckle 29 a non-circular portion 52,—preferably square,—is provided.

A brake drum 53 is mounted rigidly upon each of the rear wheels 22, but instead of being cylindrical, the flange 54 of each drum 53 has the configuration of a conical frustum. Associated with each of the brake drums 53 is another conical brake member 56, which also is provided with a frusto-conical flange 57, upon the outer surface of which a suitable friction lining 58 is provided. The brake member 56 is adapted to be received inside the conical flange 54 of the drum 53, the parts being so proportioned and arranged that when the member 56 moves into the drum 53 the lining 58 will be pressed against the inner surface of the flange 54 to resist relative rotation between the members 56 and 53. The member 56 is mounted for sliding movement upon the non-circular portion 52 of the associated steering knuckle 29, the result being that it is held against rotation. For this purpose, each of the inner brake members 56 is provided with a head 59 having a bore substantially complementary in shape to the cross sectional configuration of the non-circular portion 52 of the associated steering knuckle, this head being rigidly connected to the associated inner brake member 56 in any suitable manner, and preferably provided with braces 61 to yield a stronger construction.

The brake-acuating mechanism comprises a double bell crank 66 associated with each of the brake members 56. Each bell crank embraces the associated steering knuckle 29 and is pivotally mounted thereupon by means of a horizontal pin 67 extending through a hole 68 provided in the steering knuckle 29 for that purpose. From the pin 67 one leg 69 extends vertically downwards upon each side of the knuckle 29, and another leg 70 extends horizontally upon each side of the knuckle 29 from the pivot pin 67. In order to yield a unitary construction of the double bell crank 66, I prefer that the two horizontal legs 70 be joined as by a web 71, from which, however, the two legs 70 extend far enough to embrace the associated vertical shaft 28. Those portions of the horizontal legs 70 which embrace the vertical shaft 28 are engaged by the bifurcated end 72 of a lever 73, which also embraces the same shaft 28, the bifurcated end 72 resting upon the upper surface of the legs 70, as clearly shown upon Figs. 5 and 6. Each of these levers 73 is pivoted as by a pin 74 adjacent the associated end of the axle 16, and rigid with each lever 73 is an arm 76 extending upwards from the associated pin 74.

Means are provided for forcing the arms 76 of both levers 73 outwards so as to apply the brakes associated with both rear wheels 22 simultaneously. This brake-applying mechanism comprises a T-shaped lever 77 pivoted as at 78 upon a lug 79 rigid with the axle 16 substantially midway between its ends. Each of two oppositely extending legs 81 is connected by a push rod 82 to the arm 76 of one of the levers 73, and the third leg 83 of the lever 77 is connected to another push rod 84 which extends forwards to be pivoted to a crank 86 carried by a transversely extending shaft 87 mounted for rocking movement in the longitudinal members 12 of the frame 11. This shaft 87 is adapted to be rocked by means of another crank 88 rigid therewith, and connected by a link 89 to the lower end 91 of a brake pedal 92 in such a manner that when the pedal 92 is depressed the link 89 will be pushed, thereby turning the rock shaft 87 and pushing the push rod 84 toward the rear of the vehicle, thereby causing the T-shaped lever 77 to turn in a counterclockwise direction, as viewed upon Fig. 4. This causes both push rods 82 to be pushed laterally outwards, thereby swinging the bifurcated ends 72 of the levers 73 downwards and pressing the horizontal legs 70 of both bell cranks downwards. This causes the vertical legs 69 of the bell cranks to be forced outwards. The vertical legs 69 of each bell crank 66 are connected to the head 59 of the associated inner brake member 56 by links 96 having pins 97 disposed in slots 98 in the legs 69, so that when the bell cranks 66 are turned as hereinabove described, the links 96 will be forced outwards, pressing the associated inner brake member 56 into the outer brake member 53, and thereby developing resistance to rotation of the associated wheel 22. The brake is normally held released by a coil spring 98 encircling each shaft 28, and under compression between the associated prong 32 and a washer 99 which is pressed upwards against the under surface of the horizontal legs 70 of the associated bell crank 66.

Thus it may be seen that I have provided a novel design of automotive vehicle, possessed of all the advantages of the front wheel drive, and avoiding the inconvenience of applying the rotative power to the same wheels as those whereby steering is accomplished. However, another advantage of steering the vehicle by means of the rear wheels is that greater facility of maneuvering the vehicle is attained, particularly in traffic and when moving the vehicle into or out of a restricted parking space. Furthermore, the dirigible rear wheels can, as a result of providing the control mechanism hereinabove described, be turned about the vertical axes of their respective Lemoine pivots through substantially 90°, thereby making it possible to turn the vehicle in a much shorter radius as compared with vehicles of more conventional construction.

It is to be understood that the details of the invention as herein disclosed, are subject to alteration within the spirit or scope of the appended claims.

I claim:

1. In an automotive vehicle having dirigible rear wheels, a rear axle bifurcated at each end to provide a pair of vertically spaced prongs, a substantially vertical stationary shaft extending between the prongs of each pair, a steering knuckle associated with each end of said axle, a spindle on each of said knuckles, and a wheel journaled upon each of said spindles, the inner end of each of said knuckles being bifurcated to provide vertically spaced prongs mounted upon the associated vertical shaft for rotary movement about a vertical axis, a driven bevel gear wheel rigid with one of the prongs of each of said knuckles and encircling said vertical shaft, driving bevel gear wheels enmeshed with said driven bevel gear wheels, and a steering mchanism for turning said driving gear wheels.

2. In an automotive vehicle having dirigible rear wheels, a rear axle bifurcated at each end to provide a pair of vertically spaced prongs, a substantially vertical stationary shaft extending between the prongs of each pair, a steering knuckle associated with each end of said axle, a spindle on each of said knuckles, a wheel journaled upon each of said spindles, the inner end of each of said knuckles being bifurcated to provide vertically spaced prongs mounted upon the associated vertical shaft for rotary movement about a vertical axis, a driven bevel gear wheel rigid with one of the prongs of each of said knuckles and encircling said vertical shaft and disposed between the prongs of the rear axle, driving bevel gear wheels enmeshed with said driven bevel gear wheels, and a steering mechanism for turning said driving gear wheels.

In testimony whereof I have signed my name to this specification.

HENRY CREMER.